Patented July 1, 1941

2,248,032

UNITED STATES PATENT OFFICE 2,248,032

MANUFACTURE OF CEMENTS FROM CALCIUM SULPHATE AND BLAST FURNACE SLAG

John Stanley Dunn, Billingham-on-Tees, and Victor Lefebure, London, England, assignors to Imperial Chemical Industries Limited, a corporation of Great Britain No Drawing. Application February 23, 1939, Serial No. 257,817. In Great Britain February 22, 1938

8 Claims. (Cl. 106—109)

(Granted under the provisions of sec. 14, act of March 2, 1927; 357 O. G. 5)

This invention relates to cements obtained from calcium sulphate and granulated blast furnace slag.

Blast furnace slag is the molten non-metallic by-product obtained during the production of iron in a blast furnace, and it is granulated by rapid cooling, e. g. by running a stream of slag into water. The slag is thus obtained in a glassy or non-crystalline form possessing hydraulic or water-setting properties, especially when mixed with an exciter such as an alkali or a sulphate, or both. The exciter chiefly used in these cements is Portland cement clinker, which liberates lime during setting. The general function of this "exciter" is to produce and accelerate optimum setting conditions and strength, particularly early strength.

The principal object of the present invention is still further to increase the tensile strength of the cements in the early stages of setting.

We have found that by the addition of small quantities of sulpho-aluminates of calcium or of substances containing them considerable improvement can be effected in the cements themselves, particularly in the tensile strength prevailing during the early stages of setting.

According to the present invention, therefore, we add to a cement comprising blast furnace slag, calcium sulphate and a lime-containing or lime-producing exciter, a small proportion, e. g. 1–5 per cent. by weight, of one or more sulpho-aluminates of calcium or of a material containing the same. The invention also includes moulded objects or masses made from the said cements. In carrying out the invention we preferably employ cements of the kind described and claimed in Dunn et al U. S. application Serial No. 257,816, namely, cements comprising blast furnace slag, calcium sulphate and a lime-containing or lime-producing exciter, in which at least 60 per cent. of the slag particles, at least 50 per cent. of the exciter particles, and at least 60 per cent. of the final mixed cement particles, are of diameter not exceeding 30 microns. As the calcium sulphate constituent of the cement we prefer to employ natural anhydrite, and as the exciter Portland cement clinker.

As examples of suitable substances for addition we give:

(a) sulpho-aluminates of calcium, obtained for example by the action of calcium sulphate on calcium aluminate solutions, whereby compounds of the formulae $3CaO.Al_2O_3.3CaSO_4.31H_2O$ and $3CaO.Al_2O_3.CaSO_4.12H_2O$ may be obtained.

(b) the product obtained by reacting ground granulated blast furnace slag, calcium sulphate and lime, in the presence of water.

(c) ground set or partially set cement made from granulated blast furnace slag, calcium sulphate and a lime-containing or lime-producing exciter, e. g. Portland cement clinker.

(During setting sulpho-aluminates of calcium are formed.)

Preferably these substances are added in a finely divided condition, i. e. such as will pass a 170 mesh B. S. S. sieve. Material in coarser form, e. g. that just passing a 50 B. S. S. sieve may also be used.

To illustrate the benefits derived from employing the said additions we give the following example:

A cement was made containing 85 parts by weight of ground granulated blast furnace slag, 15 parts anhydrite and 5 parts Portland cement. To two separate portions of this cement were added 2½% and 5% respectively of the solids formed in the interaction of blast furnace slag, gypsum and lime water. The tensile strengths of the modified and unmodified cements are shown in the following table:

| Percentage of modifier added | Tensile stength (lbs./sq. in.) after 1 day setting |
|---|---|
| 0 | 50 |
| 2½ | 68 |
| 5 | 73 |

As many apparently widely different embodiments of this invention may be made without departing from the spirit and scope thereof, it is to be understood that the invention is not limited to the specific embodiments thereof, except as defined in the appended claims.

We claim:

1. A water-setting cement comprising granulated blast furnace slag, calcium sulphate and a lime-containing or lime-producing exciter, to which has been added before setting of said cement a small proportion of one or more sulpho-aluminates of calcium or of a material containing the same to increase the tensile strength of said cement in the early stages of setting.

2. A cement according to claim 1 in which at least 60 per cent. of the slag particles, at least 50 per cent. of the exciter particles, and at least 60 per cent. of the cement mixture to which the sulpho-aluminates are added are of diameter not exceeding 30 microns.

3. A cement according to claim 1, in which the calcium sulphate constituent of the cement is natural anhydrite.

4. A cement according to claim 1, in which the exciter is Portland cement clinker.

5. A cement according to claim 1, in which the sulpho-aluminates are added in finely divided condition, i. e. such as will pass a 170 mesh B. S. S. sieve.

6. A cement according to claim 1, in which the proportion of added sulpho-aluminates or material containing the same is 1-5 per cent. by weight of the cement.

7. A cement according to claim 1, in which the calcium sulphate constituent is natural anhydrite and in which the exciter is Portland cement clinker.

8. A water-setting cement of the type comprising granulated blast furnace slag, calcium sulphate and a lime-containing or lime-producing exciter, to which has been added before setting of said cement to increase the tensile strength thereof in the early stages of setting a small proportion of ground already set cement of the said type.

JOHN STANLEY DUNN.
VICTOR LEFEBURE.